United States Patent Office 3,567,621
Patented Mar. 2, 1971

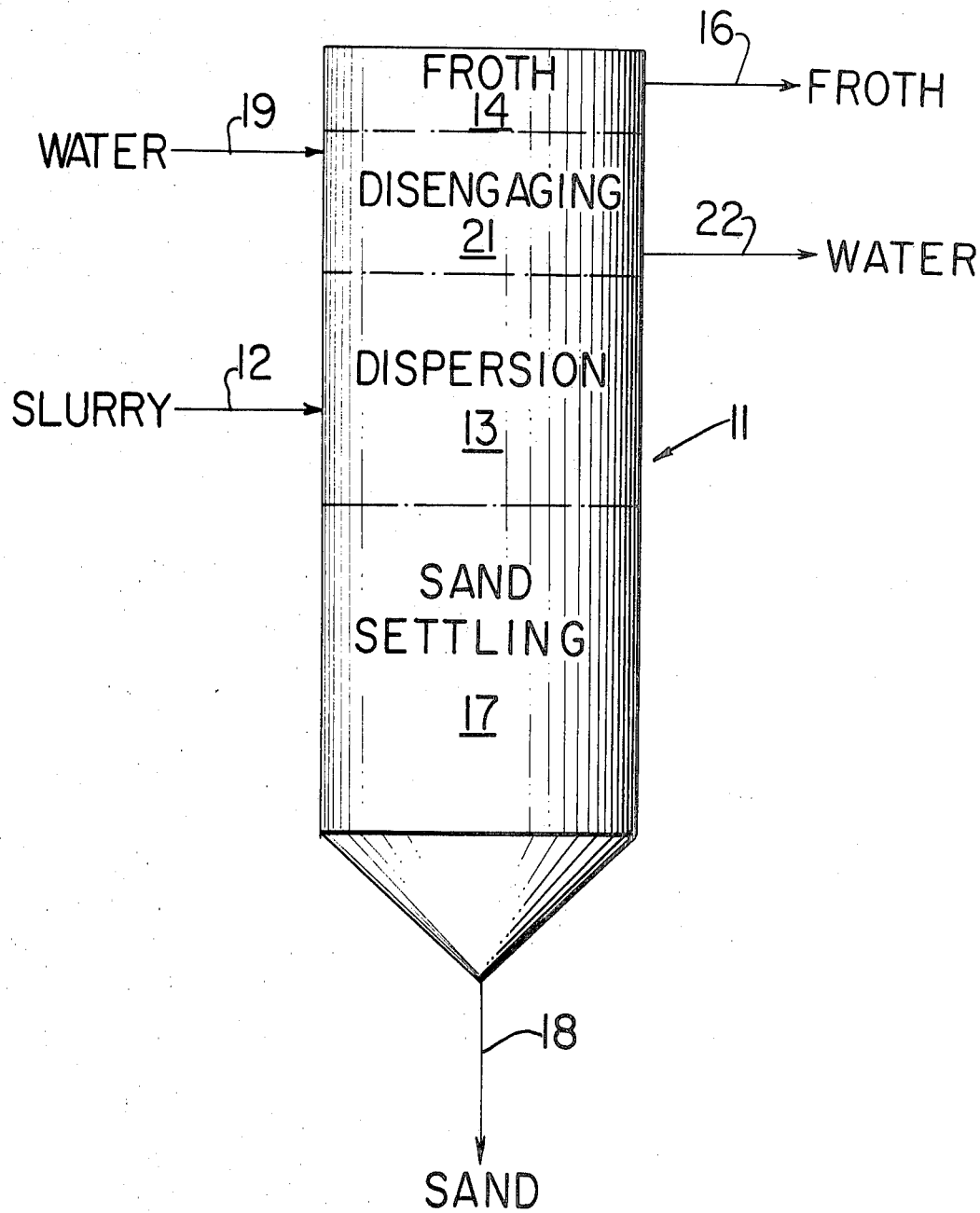

3,567,621
RECOVERY OF BITUMEN FROM BITUMINOUS SAND
George Ronald Gray and Lubomyr M. O. Cymbalisty, Edmonton, Alberta, Canada, assignors to Cities Service Athabasca, Inc.; Imperial Oil Limited; Atlantic Richfield Corporation; and Royalite Oil Company Limited, fractional part interest to each
Filed June 17, 1968, Ser. No. 737,655
Int. Cl. C10g 1/04
U.S. Cl. 208—11                                        4 Claims

ABSTRACT OF THE DISCLOSURE

A process for the recovery of bitumen from tar sand in which a fluid slurry of tar sand is introduced into a body of hot water with bitumen rising to the top in the form of a layer of bituminous emulsion and sand settling to the bottom. Water is introduced immediately below the layer of bituminous emulsion to displace solids, froth particles associated with coarse solids, and prevent entrainment of fines in the emulsion. The additional water is preferably introduced into a quiescent zone in which a very slow downward velocity of water is maintained and water may be withdrawn from the lower portion of the quiescent zone to maintain a suitable downward velocity of water within the quiescent zone.

Large deposits of bituminous sand are found in various localities throughout the world. The term "bituminous sand" is used herein to include those materials commonly referred to as oil sand, tar sand and the like. One of the most extensive deposits of bituminous sand occurs, for instance, in the Athabasca District of the Province of Alberta, Canada.

Typically, these sands contain from about 6% to about 20% of bitumen (also referred to herein as oil), from about 1% to about 10% of water, and from about 70% to about 90% of mineral solids. The specific gravity of the bitumen varies from about 1.0 to about 1.05 and the bitumen has an API gravity of about 8.0 degrees. This value for specific gravity as well as that of the specific gravity of any other material given herein is taken at 60° F. All percentage values are on a weight basis unless otherwise specified.

The major portion, by weight, of the mineral solids in bituminous sand is quartz sand having a particle size greater than about 45 microns and less than 2,000 microns. The term "mineral" is used herein to describe material of inorganic origin such as sand, clay and the like as distinguished from material of organic origin such as coke. For the most part, the remaining mineral solid material has a particle size of less than about 45 microns. This smaller-size mineral solid material is referred to as "fines." The fines contain clay and silt including some very small particles of sand. The fines content typically varies from about 10% to about 30% by weight of the total solid mineral content of bituminous sand. However, it is not uncommon for the ingredients of bituminous sand to vary from the above-mentioned concentrations.

Various methods are known for separating bitumen from bituminous sand. Some of these methods involve the use of water for preparing a slurry at a temperature above about 75° F. Most of the coarse sand and portions of the fines are separated from the slurry by various means, such as settling, to recover an emulsion, or froth, which contains some of the fines and quantities of coarse sand. Such an emulsion or froth is referred to herein as a bituminous emulsion. One well-known method for preparing such emulsions is often referred to as the "hot-water process." In the hot-water process, the bituminous sand is slurried with steam and hot water at about 180° F. and the pulp is then agitated with a stream of circulating hot water and carried to a separation cell containing a body of hot water maintained at an elevated temperature of about 180° F. In the separation cell, entrained air causes the bitumen to rise to the top of the cell in the form of an emulsion containing air, bitumen, water and mineral solids. The mineral solids are extremely difficult to separate from the bitumen and, unless the emulsion is further treated, it will generally contain at least 5% of mineral solids. This bituminous emulsion or froth can be subjected to water washing to effect a partial reduction in solids.

A bituminous emulsion, such as that obtained by the above-described procedures, often contains from about 10% to about 60% water, 2% to about 20% of mineral solids and from about 30% to about 85% bitumen. Usually, however, the bituminous emulsion or froth will contain, by weight, from about 25% to about 50% water, about 5% to about 12% mineral solids and about 35% to about 70% of bitumen.

Separation of water and mineral solids from the bituminous emulsion is necessary for most ultimate uses of the bitumen. A number of methods have been devised for breaking bituminous emulsions and recovering the bitumen. A particularly suitable method involves the use of thermal dehydration followed by cycloning as described in U.S. Pat. No. 3,338,814 to R. A. Given et al.

One of the problems associated with conventional processes for recovery of bitumen from tar sands is that the bituminous emulsions formed by introduction of tar sand slurry into a body of water in a separation cell as described above tend to contain undesirably large quantities of solids. It has now been found that the entrainment of such solids in the bituminous emulsion can be substantially reduced by introducing additional water into the separation cell at a point just below the emulsion-water interface and above the point of introduction of slurry into the separation cell.

The accompanying drawing is a somewhat diagrammatic illustration of a suitable arrangement of appartus for crrying out preferred embodiment of the invention.

By introducing additional water into the body of water in the separation cell immediately under the layer of froth or emulsion which forms at the top of the water, it is possible to displace a considerable amount of the solids which are normally carried up and entrapped in the froth layer. This results in improved froth quality, i.e., lower solids content, and in a reduction of the total amount of water needed for the recovery process. Water may be added in accordance with the invention in any suitable quantities such as between about 0.1 and about 5 lbs. of water per pound of bitumen in recovered emulsion.

While merely adding water to the separation cell immediately below the froth layer as described above is beneficial in displacing solids and preventing entrainment of solids in froth, it is preferred that a disengaging zone be established immediately below the froth layer in which a small downward movement of water is maintained in order to carry solids away from the froth layer, thereby further reducing chance of entrainment of solids in the froth layer. This may be accomplished in any suitable manner such as by the use of baffles to create a quiescent zone. Addition of water immediately beneath the froth layer is preferably controlled so that the downward movement of water in the disengagement zone is between about 0.05 and about 2.5 ft. per minute. Other movement of mixtures of water, bitumen and solids within the disengagement zone is also preferably maintained less than about 2.5 ft. per minute in order to reduce agitation and further reduce entrainment of solids in froth.

Water may be withdrawn from a point below the introduction of additional water but above the point of introduction of the slurry into the body of water in the separation cell to minimize downward velocities in lower portion of the separation cell and thereby minimize loss of bitumen to sand tailings. Water withdrawn in this manner may be recycled to earlier stages of the recovery process and if desired may be treated for secondary recovery of bitumen or removal of solids therefrom.

As is customary in bitumen recovery processes of the general type described herein, air or other gas may be present in the body of water in the separation cell either through entrainment with slurry introduced into the cell or through separate introduction of air in a conventional manner. It is preferred, however, when operating in accordance with the present invention, that any air bubbles passing upwardly through the disengagement zone described above be limited to bubbles having diameters not in excess of 500 microns. Gas bubbles of larger sizes are likely to carry solids up into the froth layer. Size of air bubbles can be controlled by regulating the type of slurry used, controlling the conditions of slurry transport or by controlling the degree of agitation to which the slurry is subjected in the separation cell.

While any suitable apparatus may be used in carrying out the present invention, apparatus of the type shown and described in the copending application entitled Separation Vessel of Lubomyr M. O. Cymbalisty, filed concurrently herewith is especially suited for such use.

For a better understanding of the invention, reference may be had to the accompanying drawing which shows a separation vessel 11 in which a body of hot water is maintained. In the practice of the invention, an aqueous slurry of bituminous sand is introduced through a conduit 12 into the separation vessel 11 and is dispersed within the body of water in the separation vessel in a dispersion zone 13. Air entrained in the slurry causes bitumen to rise to the top of the body of hot water in the vessel 11 and form a layer of bituminous emulsion or froth 14 which may be removed through a conduit 16 as the product of the process. This froth may, of course, be treated in accordance with known techniques for recovery of bitumen therefrom. Sand settles to the bottom of the vessel 11 in a sand settling zone 17 and may be removed as through a conduit 18.

In accordance with the invention, water is introduced into the upper portion of the vessel 11 immediately below the froth layer 14 through a conduit 19. Water introduced through the conduit 19 is introduced into the upper portion of a disengaging zone 21 maintained above the dispersion zone 13, In the disengaging zone 21, bitumen disengages from fine solids and enters the froth layer 14. Water is preferably withdrawn from the lower portion of the disengaging zone 21 as through a conduit 22. This water may be recycled to an earlier portion of the bitumen recovery process and may, if desired, be treated for removal of solids or bitumen therefrom. Other movement of mixtures of water, bitumen and solids within the disengaging zone is likewise preferably kept to less than about 2.5 ft. per minute in order to prevent unnecessary entrainment of fine solids in the froth layer 14.

The following example will illustrate the application of the present invention in the recovery of bitumen from tar sand.

EXAMPLE

In this example, a separation vessel similar in operation to the separation vessel 11 described above is used to recover bituminous froth from an aqueous slurry of bituminous sand. Two runs are reported herein. In Run No. 1, no water was added between the point of introduction of the slurry to the middle of the body of hot water as through the conduit 19 immediately below the froth layer in accordance with the present invention. In both cases, the slurry fed to the separation zone contained 750 lbs. per hour of tar sand. For Run No. 2 in which water was added through conduit 19 in accordance with the invention, the slurry introduced through the conduit 12 included 140 lbs. per hour of water introduced through the conduit 19 amounted to 90 lbs. per hour. In Run No. 1 in which no water was added through the conduit 19, the same total amount of water was used, i.e., the total water in the slurry introduced through the conduit 12 amounted to about 230 lbs. per hour. Temperature of the body of hot water in the separation zone was in both cases maintained between about 155 and about 160° F. No water was removed through the conduit 22. Compositions of feed and products for both of these runs are reported in Table I below. The composition of material recovered from the froth layer at the top of the body of water in the separation vessel as through the conduit 16 while the composition of the material listed as bottoms is the composition of the material removed from the bottom of the separation vessel as through the conduit 18.

TABLE I

[Composition (wt. percent)]

| Component | Tar sand feed | Run No. 1 | | Run No. 2 | |
| --- | --- | --- | --- | --- | --- |
| | | Froth | Bottoms | Froth | Bottoms |
| Bitumen | 10.57 | 54.84 | 1.55 | 73.11 | 1.78 |
| Water | 4.28 | 37.79 | 39.45 | 22.97 | 38.68 |
| Solids | 84.94 | 7.37 | 59.10 | 3.97 | 59.54 |

It can be seen from Table I above that use of part of the total water in the form of separate additional water added immediately below the froth layer as in Run 2 produced a froth having about half the solids content of the froth recovered from Run 1 wherein no water was added just below the froth layer. In both Run 1 and Run 2, total recovery of bitumen in the froth was about the same, i.e., about 80% based on bitumen present in the original tar sand. The froth recovered from Run 1 contained about 13.4 lbs. of solids per hundred pounds of bitumen while the froth recovered from Run 2 contained 5.4 lbs. of solids per hundred pounds of bitumen.

While the invention has been described above with respect to a preferred embodiment thereof, it will be understood by those skilled in the art that various changes and modifications may be made without departing from the spirit and scope of the invention and it is intended to cover all such changes and modifications in the appended claims.

We claim:

1. In a process for the recovery of bitumen from bituminous sand in which a fluid slurry of bituminous sand is introduced into an intermediate portion of a body of water and in which bitumen is floated to the top of such body of water to form a layer of bituminous emulsion thereon for recovery therefrom while sand is allowed to settle to the bottom of such body of water for removal therefrom, the improvement which comprises introducing additional water into an upper portion of such body of water below such layer of bituminous emulsion and above said intermediate portion of such body of water and withdrawing water from such body of water at the point above the introduction of the slurry thereto and below the point of introduction of the additional water thereto while maintaining the fluid velocity of the mixture of water, bitumen and solids in the portion of the body of water above the point at which water is so withdrawn, not more than about 2.5 ft. per minute.

2. The process of claim 1 in which between about 0.1 and about 5 pounds of water per pound of bitumen in recovered emulsion is added to the upper portion of the body of water below the layer of bituminous emulsion.

3. The process of claim 1 in which a downward movement of water is maintained at a velocity between about 0.05 and about 2.5 ft. per minute from the point of introduction of additional water to the point of withdrawal of water.

4. The process of claim 3 in which air is passed upwardly through the portion of the body of water in which the downward flow of water is maintained and in which all such air is in the form of bubbles having diameters less than about 500 microns.

References Cited

UNITED STATES PATENTS

| 2,903,407 | 9/1959 | Fischer et al. | 208—11 |
| 3,152,979 | 10/1964 | Bichard et al. | 208—11 |
| 3,401,110 | 9/1968 | Floyd et al. | 208—11 |

FOREIGN PATENTS

| 680,576 | 2/1964 | Canada | 208—11 |

CURTIS R. DAVIS, Primary Examiner

U.S. Cl. X.R.

209—166

PO-1050
(5/69)

UNITED STATES PATENT OFFICE
CERTIFICATE OF CORRECTION

Patent No. 3,567,621                          Dated  March 2, 1971

Inventor(s)        G. R. Gray et al

It is certified that error appears in the above-identified patent and that said Letters Patent are hereby corrected as shown below:

Column 4, line 14, after conduit should read --12 and the froth layer on the top of the body of water. In Run No. 2, water was introduced through the conduit--;
Column 4, line 21, after water should read --and the additic water--;
Column 4, line 31, after composition should read --listed fc froth in each of the runs in Table I is the composition--

Signed and sealed this 30th day of November 1971.

(SEAL)
Attest:

EDWARD M. FLETCHER, JR.
Attesting Officer

ROBERT GOTTSCHALK
Acting Commissioner of Patent